United States Patent [19]

Tamai et al.

[11] 4,364,058

[45] Dec. 14, 1982

[54] INK DROP CHARGING DEVICE

[75] Inventors: Masayoshi Tamai; Michio Ueda; Masatsugu Kikuchi, all of Kanagawa, Japan

[73] Assignee: Fuji Xerox Co., Ltd., Tokyo, Japan

[21] Appl. No.: 191,621

[22] Filed: Sep. 29, 1980

[30] Foreign Application Priority Data

Oct. 29, 1979 [JP] Japan ................................ 54-138735

[51] Int. Cl.³ ............................................ G01D 15/18

[52] U.S. Cl. .................................. 346/75; 346/140 R

[58] Field of Search .............................. 346/75, 140 IJ

[56] References Cited

U.S. PATENT DOCUMENTS 3,846,800 11/1974 Chen ................................ 346/75 X 4,217,595 8/1980 Horike et al. ......................... 346/75

*Primary Examiner*—George H. Miller, Jr.

*Attorney, Agent, or Firm*—Sughrue, Mion, Zinn, Macpeak & Seas

[57] ABSTRACT

An ink droplet charging device and method in which ink droplets are alternately charged positive, negative and with zero charges to prevent the accumulation of foreign particles upon charging electrodes. A nozzle jets an ink stream which is divided into ink droplets. A charging electrode disposed at the position where the ink stream divides into the droplets controls the charge condition of the ink droplets according to whether the ink droplets are utilized for printing or not. Positive, negative and ground level voltages are applied to the charging electrode in synchronization with the formation of the ink droplets.

4 Claims, 15 Drawing Figures

INK DROP CHARGING DEVICE

BACKGROUND OF THE INVENTION

The present invention relates to ink drop charging devices. More particularly, the invention relates to an ink drop charging device adapted for use with a charging binary type multi-nozzle ink jet printer.

In an ink jet printer of the general type to which the invention pertains, ink particles not used for printing are charged and the ink particles thus charged deflected in a direction perpendicular to the direction of the ink jet while passing through a deflecting field which is created by deflecting electrodes as a result of which the charged ink particles or droplets are removed from the primary or printing stream and collected in a gutter. Ink particles used for printing are not charged. The uncharged ink particles move straightly through the deflecting field to the recording medium and are used to form recorded images or characters in the form of dots.

The charging electrode array is made up of a plurality of electrodes which are electrically insulated from one another. Each electrode is in the form of a tunnel so as to charge the corresponding ink jet and to prevent the occurrence of interference with adjacent electrodes. That is, the ink jet flows along the central axis of the tunnel-shaped electrode.

A charging signal applied to the charging electrode has the same potential as that of the ink jet, usually, the ground potential, for the ink droplets used for printing. On the other hand, a positive or negative potential is applied to ink droplets which are not used for printing and are recovered by the gutter. Application of these potentials is effected when an ink droplet is about to leave the ink jet.

FIG. 1 illustrates the relationship between the charging signals and the ink drops. An ink stream 2 jetted by a nozzle 1 is broken into ink droplets 3, 4, 5 and 6 successively by action of a piezoelectric element (not shown) which oscillates in synchronization with the charging signals. The velocity of the ink droplets is sufficiently high that no special synchronization techniques are required and the piezoelectric element can be driven with the charging signal. The ink droplets 3 through 6 are charged or not charged depending upon the state of the charging signal during pulse periods 3A through 6A. For instance, during pulse period 5A in which the signal is at ground potential, the ink droplet 5 is not charged while during the pulse period 6A in which the signal is at a negative potential such as 100 V, the ink droplet 6 is charged positive. Thus, the ink jet and the jetted ink drops are charged positive or not charged and the sum of the charges on the ink droplets is positive.

The structure of the charging electrode 10 described above is shown in FIG. 2. An electrode portion 12 is formed on an insulating substrate 11. In order to prevent the occurrence of a short-circuit should the electrode portions 12 be wet, the electrode portion is completely covered with an insulating film 13. In FIG. 2, the charging electrode 10 is at a negative potential and therefore positive charges are accumulated on the surface of the ink 2.

If, under this condition, a foreign particle 151 such as a dust particle floating in the air is brought into contact with the ink, the particle will be charged by the ink 2. That is, the particle is charged positive. The particle 152 thus charged positive is attracted towards the charging electrode 10 by the electrostatic field created between the ink and the charging electrode and is held by electrostatic force upon the surface of the insulating film 13.

at this process continues, the charging electrode will become completely charged up. As a result, the ink droplets cannot be correctly charged because of the charges which are created on the charging electrode by the accumulated particles. This phenomenon becomes more significant in the case where the inside of the charging tunnel in the charging electrode is dirty because in this case the charged floating particles can be readily caught by the dirty charging tunnel.

Accordingly, an object of the present invention is to provide an ink droplet charging device in which charging up of the charging electrode is prevented whereby ink droplets are correctly charged at all times.

SUMMARY OF THE INVENTION

In accordance with this and other objects of the invention there is provided an ink drop charging device including a nozzle for jetting an ink stream which is divided into ink droplets, a charging electrode disposed at a position where the ink stream divides into the ink droplets for controlling a charge condition of the ink droplets according to whether the ink droplets are to be utilized for printing or not, and means for successively applying positive, negative and ground voltage levels to the charging electrode in synchronization with the formation of the ink droplets. Preferably, the charging electrode is covered with an insulating layer.

Further in accordance with this and other objects of the invention there is provided a method for charging ink droplets in an ink jet printer including the steps of jetting an ink stream with a nozzle, dividing the stream into ink droplets, charging the droplets of the ink stream for controlling a charge condition of the ink droplets according to whether the ink droplets are to be utilized for printing, and charging the ink droplets with positive, negative or zero charges in synchronization with the formation of the ink droplets.

DESCRIPTION OF THE PREFERRED EMBODIMENTS

Figure 1A:
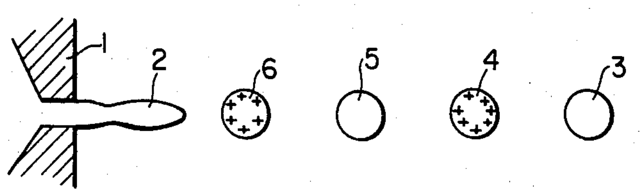
FIGS. 1A and 1B are explanatory diagrams indicating the relation between a charging signal and charges on ink droplets in a charging binary type ink jet printer.
Figure 1B:
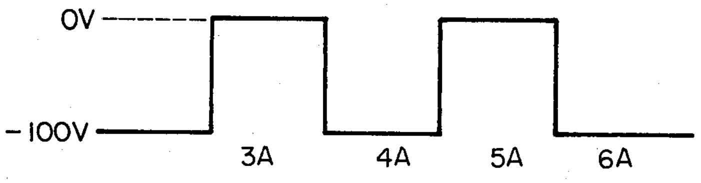
Figure 2:
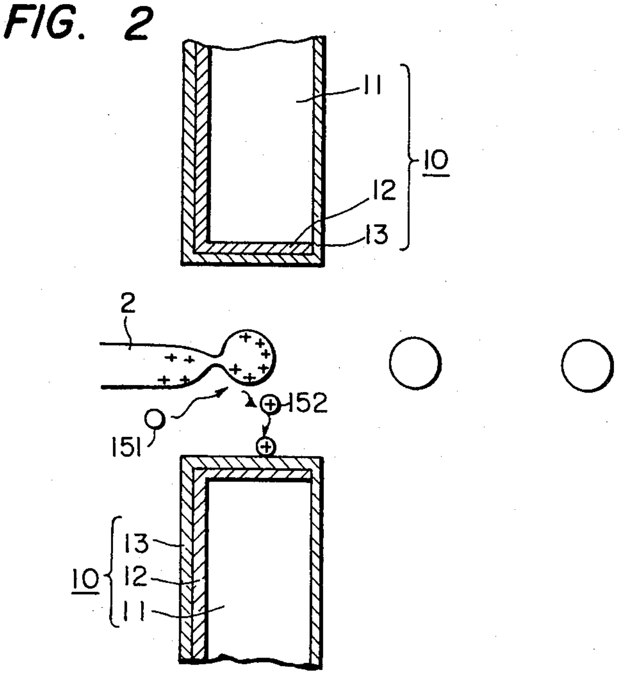
FIG. 2 is a diagram illustrating a process of accumulating charges on a charging electrode covered with an insulating film.
Figure 3A:
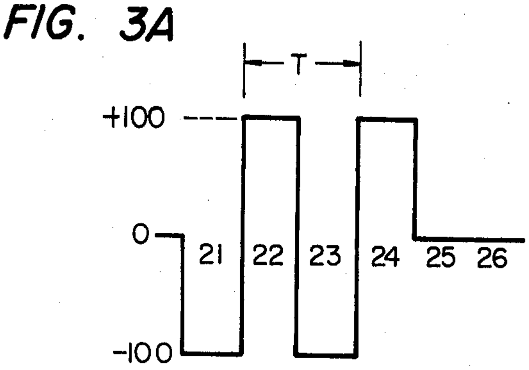
FIGS. 3A–3C are diagrams for a decription of the operation of an ink drop charging device constructed according to the invention.
Figure 3B:
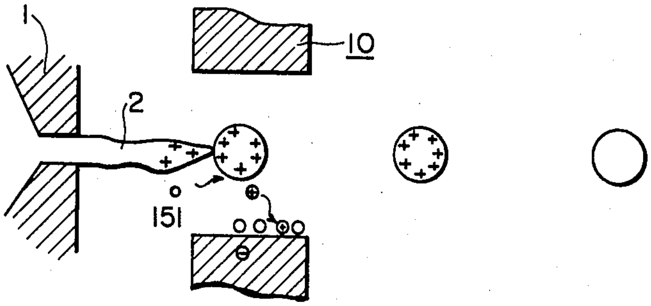

Principles of the invention will be described with reference to FIG. 3. In accordance with the invention, for charging ink droplets, the voltage applied assumes both positive and negative values during a time period T as shown in FIG. 3A. When the negative voltage levels 21 and 23 are applied, the configuration of an ink droplet is such that, as shown in FIG. 3B, the ink droplet is about to separate from the ink steam 2 and therefore the ink droplet can be charged in accordance with the voltage of a charging electrode 10.

Figure 3C:
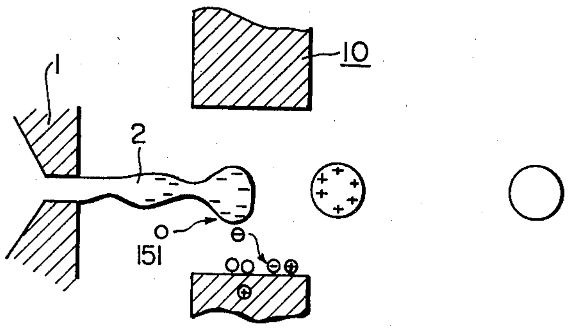

As described above, a foreign particle 151 floating in the air may come into contact with the ink droplet or the ink stream 2 as a result of which the particle 151 is positively charged and therefore adheres to the insulating film of the charging electrode 10. When the voltage applied is positive during the time periods 22 and 24, the charging electrode 10 is at the positive potential and therefore negative charges are induced on the ink stream 2 as illustrated in FIG. 3C. Under this condition, a floating particle 151 will be negatively charged and therefore adheres to the insulating film 13 of the charging electrode 10. Accordingly, in this case, the negatively charged particles are neutralized by the positively charged particles which previously accumulated on the insulating film. Thus, no charge-up phenomenon is present. During the periods 22 and 24, the ink stream is not split into ink droplets and therefore the ink droplets separated from the ink stream are never negatively charged.

Figure 4:
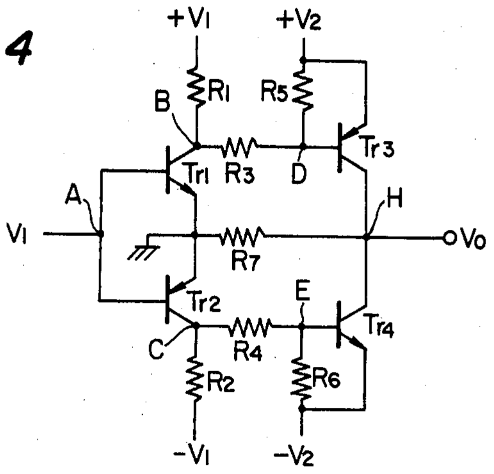
FIG. 4 is a circuit diagram showing an example of a charging electric source suitable for use with the ink drop charging device of the invention.

FIG. 4 shows an example of a driver circuit which may be utilized for generating the three voltage levels as shown in FIG. 3A. The driver circuit includes transistors $Tr_1$ through $Tr_4$, resistors $R_1$ through $R_7$ and different voltage sources at $\pm V_1$ and $\pm V_2$. The voltage source $\pm V_1$ is used to render the transistors $Tr_3$ and $Tr_4$ conductive or non-conductive and may have an output voltage of several volts. The voltages $\pm V_2$ are used to charge the ink droplets and has an output voltage of preferably several tens of volts or higher.

FIGS. 5A–5H show voltage waveforms at various points in the circuit shown in FIG. 4. The operation of the circuit of FIG. 4 will be described with reference to FIGS. 5A–5H.

Figure 5A:
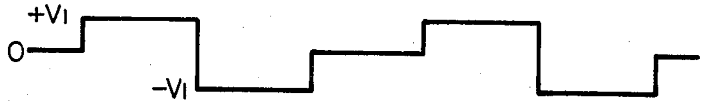
FIGS. 5A–5H are a series of waveforms at various points in the circuit shown in FIG. 4.
Figure 5B:
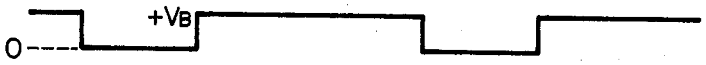
Figure 5C:
Figure 5D:
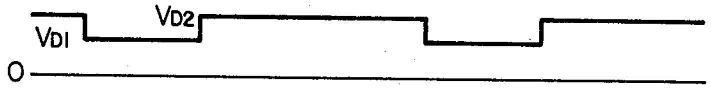
Figure 5E:
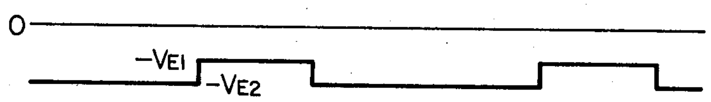

FIG. 5A shows an input waveform to the circuit. The input waveform has three different potentials 0, $+Vi$ and $-Vi$. When the input waveform is at $+Vi$, the transistor $Tr_1$ is rendered conductive as a result of which the voltage at the point B is zero. When the input is 0 or $-Vi$, the transistor $Tr_1$ is rendered non-conductive and therefore the voltage at the point B is:

$$V_B = \frac{R_1}{R_1 + R_3 + R_5}(V_2 - V_1).$$

When the voltage at the point B is zero, the potential at the point D is:

$$V_{D1} = \frac{R_3}{R_3 + R_5}V_2.$$

When the voltage at the point B is $V_B$, the potential at the point D is:

$$V_{D2} = \frac{R_1 + R_3}{R_1 + R_3 + R_5}(V_2 - V_1).$$

The resistances $R_1$, $R_3$ and $R_5$ can be determined such that, taking into account the values of $V_{D1}$ and $V_{D2}$, the transistor $Tr_3$ is rendered alternately conductive and non-conductive.

Figure 5F:

FIG. 5F illustrates a voltage waveform at the point H in FIG. 4 in a hypotential case where the transistors $Tr_2$ and $Tr_4$ are eliminated from the circuit. The transistor $Tr_3$ is rendered conductive when its base voltage is $V_{D1}$ and is rendered non-conductive when the base voltage is $V_{D2}$. Accordingly, the voltage at the point F is set to $+V_2$ and zero, respectively.

Figure 5G:
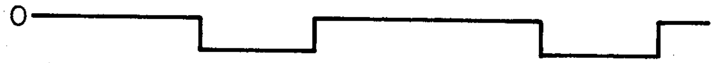

The operation and voltage variation of the positive side of the circuit shown in FIG. 4 has been described above. The operation of the negative side will be briefly described. When the input is $-Vi$, the transistor $Tr_2$ is rendered conductive and therefore the transistor $Tr_4$ is also rendered conductive. If it is assumed that the transistors $Tr_1$ and $Tr_3$ are eliminated from the circuit in FIG. 4, then the voltage at the point H is set to $-V_2$. Furthermore, when the input is $+Vi$ or zero, both the transistors $Tr_2$ and $Tr_4$ are non-conductive. Similarly, if it is assumed that that the transistors $Tr_1$ and $Tr_3$ are eliminated from the circuit, then the potential at the point H is set to zero. That is, the voltage waveform at the point H in the case where the transistors $Tr_1$ and $Tr_3$ are not provided is as shown in FIG. 5G. It is apparent from the above description that the fundamental operation of the negative side of the circuit is similar to that of the positive side.

Figure 5H:
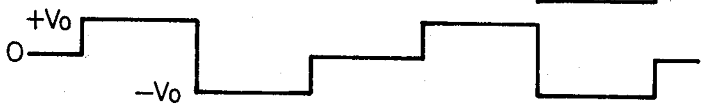

The potential at the point H in the circuit of FIG. 4 with the positive and negative sides are coupled at the output as actually shown in FIG. 4 as indicated in FIG. 5H. As can be readily understood at this point, if the input voltage Vi in FIG. 4 is properly controlled, then the desired voltage waveform as shown in FIG. 3A is obtained.

The circuit shown in FIG. 4 can operate with AC coupling in which, instead of the resistors $R_3$ and $R_4$, capacitors are employed and in which case various other circuit components are employed to obtain the voltage waveform shown in FIG. 3A.

A specific example of a drop charging device constructed according to the invention will be described. Ink was jetted by a nozzle 40 $\mu$m in diameter as a result of which ink drops were produced having a velocity of 10 m/sec and at a frequency of 55 KHz. A charging electrode having a diameter of 300 $\mu$m and a length of 300 $\mu$m was employed and $\pm$100 V was applied to the charging electrode. The ground potential was made the same as the potential of the ink stream. The potential applied to the charging electrode was as described above. In this case, no charge up phenomenon was observed.

What is claimed is:

1. An ink droplet charging device comprising: a nozzle for jetting an ink stream, said ink stream being divided into ink droplets; a charging electrode disposed at a position where said ink stream divides into said ink droplets for controlling a charge condition of said ink droplets according to whether said ink droplets are utilized for printing; and means for successively applying positive, negative and ground voltage levels to said charging electrode in synchronization with the formation of said ink droplets to deposit a charge on at least some of said ink droplets so that said charged ink droplets have an indentical type charge deposited thereon.

2. The ink droplet charging device of claim 1 further comprising an insulating film disposed over said charging electrode.

3. The ink droplet charging device of claim 1 or 2 wherein said means for successively applying positive, negative and ground voltage levels to said charging electrode comprises a first NPN transistor having an emitter coupled to ground and a collector coupled to a first positive voltage source through a first resistor; a first PNP transistor having a base coupled through a second resistor to said collector of said first NPN transistor and to a second positive voltage source through a third resistor, an emitter coupled to said second positive voltage source and an emitter coupled to an output terminal; a second PNP transistor having a base coupled to said base of said first NPN transistor and to an input terminal, an emitter coupled to ground and a collector coupled through a fourth resistor to a first negative voltage source; a second NPN transistor having a base coupled through a fifth resistor to said collector of said second PNP transistor and to a second negative voltage source through a sixth resistor, an emitter coupled to said second negative voltage source and a collector coupled to said output terminal; and a seventh resistor coupled between said output terminal and ground.

4. A method for charging ink drops in an ink jet printer comprising the steps of: jetting a stream of ink; dividing said stream of ink into ink droplets; charging an electrode alternatingly with positive, negative and zero charges in synchronization with the formation of said ink droplets, said electrode depositing a charge on at least some of said ink droplets so that said charged ink droplets each have an identical type charge thereon.

* * * * *